No. 825,537. PATENTED JULY 10, 1906.
M. HOOPES.
OIL FURNACE FOR AUTOMATICALLY HEATING METAL BLANKS.
APPLICATION FILED FEB. 17, 1906.
3 SHEETS—SHEET 1.
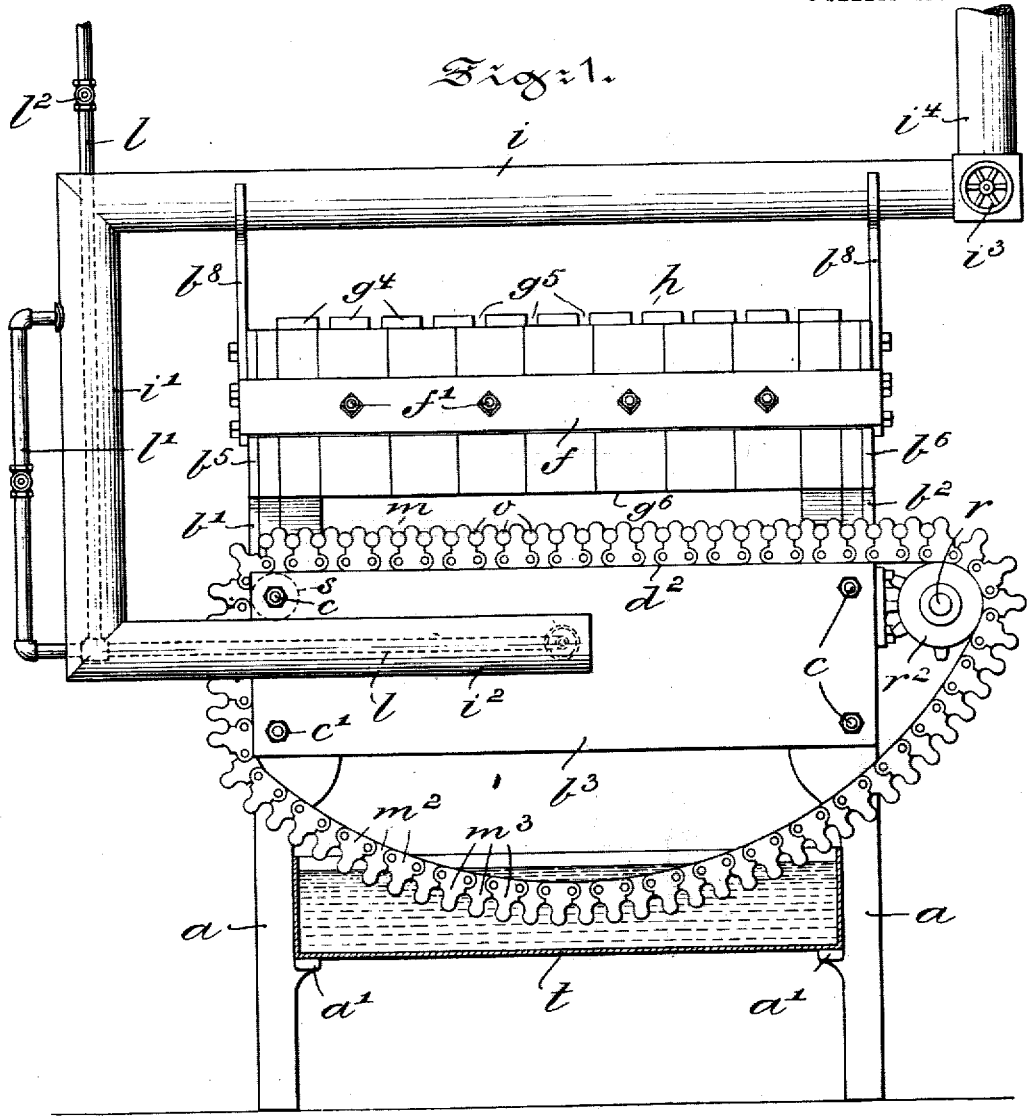
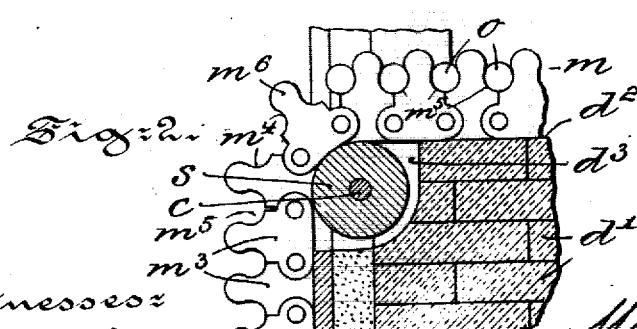

No. 825,537. PATENTED JULY 10, 1906.
M. HOOPES.
OIL FURNACE FOR AUTOMATICALLY HEATING METAL BLANKS.
APPLICATION FILED FEB. 17, 1906.
3 SHEETS—SHEET 2.
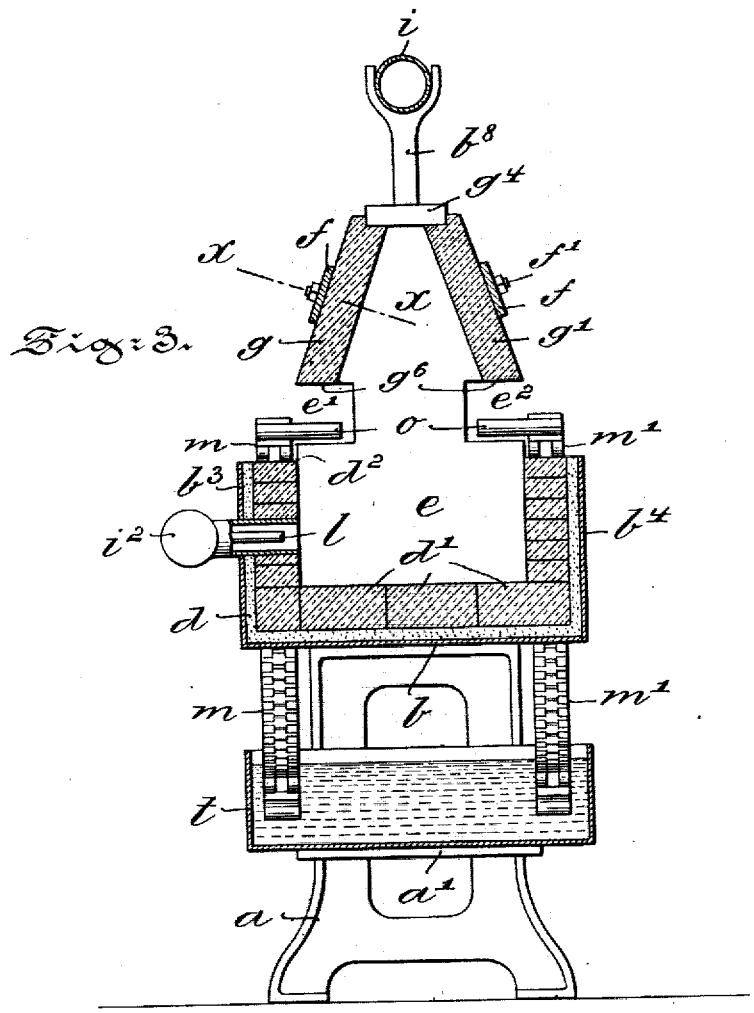
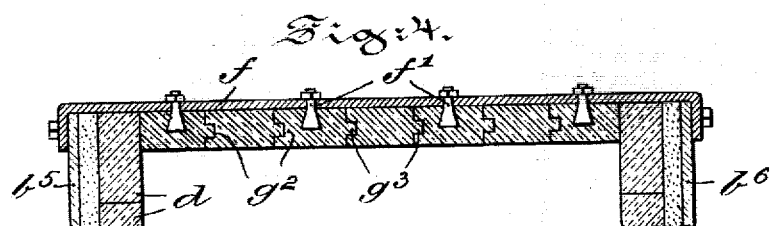

No. 825,537. PATENTED JULY 10, 1906.
M. HOOPES.
OIL FURNACE FOR AUTOMATICALLY HEATING METAL BLANKS.
APPLICATION FILED FEB. 17, 1906.
3 SHEETS—SHEET 3.
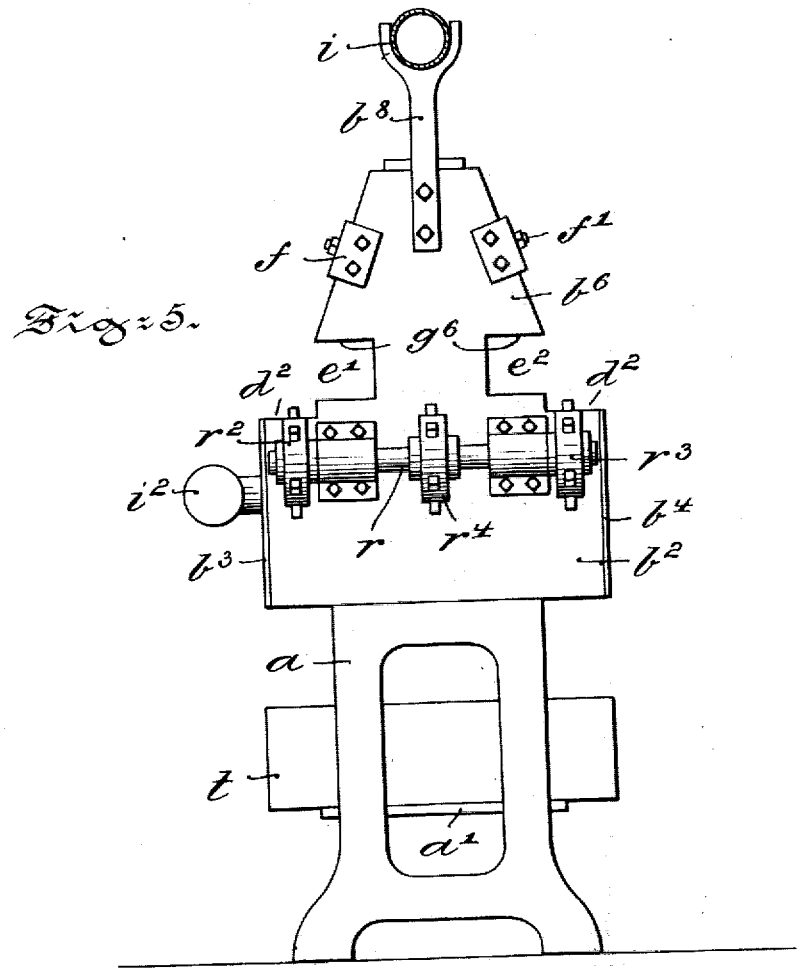
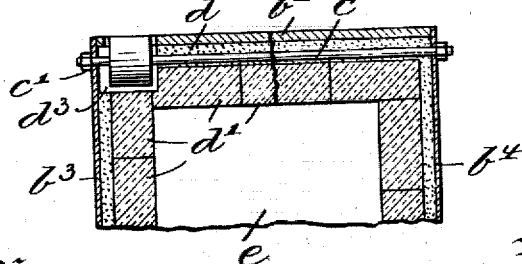

UNITED STATES PATENT OFFICE.

MACMILLAN HOOPES, OF PHILADELPHIA, PENNSYLVANIA.

OIL-FURNACE FOR AUTOMATICALLY HEATING METAL BLANKS.

No. 825,537.　　　　　　Specification of Letters Patent.　　　　　　Patented July 10, 1906.

Application filed February 17, 1906. Serial No. 301,603.

*To all whom it may concern:*

Be it known that I, MACMILLAN HOOPES, a citizen of the United States, residing at the city of Philadelphia, in the county of Philadelphia and State of Pennsylvania, have invented certain new and useful Improvements in Oil-Furnaces for Automatically Heating Metal Blanks, of which the following is a specification.

My invention has relation to an oil-furnace for heating metal blanks; and in such connection it relates to the construction and arrangement of the furnace to automatically conduct metal blanks through the furnace, so as to heat the same in passage therethrough.

The principal objects of my invention are, first, to provide an oil-furnace with endless chains, the links of which are provided with indented projections forming pincer-like jaws to securely hold the metal blanks in position during passage through the furnace; second, to provide the furnace with wheels to actuate chains and hold the same in engagement with the upper surface of certain of the walls forming the heating-chamber of the furnace; third, to so arrange the actuating-wheels for the chains as to render the same readily accessible and removable from the furnace; fourth, to provide the oil-furnace with a hood partially closed at its upper end to form, in conjunction with the walls of the heating-chamber of the furnace, longitudinal slots through which the chains and blanks are conducted; fifth, to support the side walls of the hood of the furnace with metal strips to permit of readily removing and replacing the fire-brick forming the same, and, sixth, to provide the furnace with an air-pipe to heat the air and oil prior to its introduction into the heating-chamber of the furnace.

The nature and scope of my invention will be more fully understood from the following description, taken in connection with the accompanying drawings, forming part hereof, in which—

Figure 1 is a view illustrating, partly in side elevation and partly in section, an oil-furnace, a chain having projections forming pincer-like jaws for engaging and locking metal blanks in position between the same, wheels for conducting the chain into and out of the heating-chamber of the furnace, a hood partially closed at its upper end and formed of fire-brick supported by metal strips, an air-pipe arranged above the hood for heating air, as well as oil, prior to its introduction into the furnace, and a water-tank for cooling the chain, all embodying main features of my said invention. Fig. 2 is a detail view, enlarged, illustrating, partly in side elevation and partly in section, the left-hand end portion of the furnace, the manner of arranging supporting-wheels for the chain in the walls of the furnace to permit the chain to release the metal blanks immediately after leaving the heating-chamber of the furnace. Fig. 3 is a vertical sectional view of the furnace, illustrating the heating-chamber thereof, the manner of supporting the chain by the side walls of the chamber, the hood made tapering and partially closed at its upper end, an air-pipe arranged above the same and a tank to permit of the ready removal of the chains from the furnace. Fig. 4 is a sectional view of the hood on the line $xx$ of Fig. 3. Fig. 5 is an end elevational view of the furnace, illustrating means for actuating the chains and for supporting the side walls of the hood and the air-pipe thereof; and Fig. 6 is a detail view illustrating in horizontal section a portion of the heating-chamber of the furnace, the manner of arranging chambers for the reception of supporting-wheels for the chains therein, and the connection of the side walls by rods forming an axle for the chain-supporting wheels.

Referring to the drawings, $a$ represents standards which support the oil-furnace proper, consisting of a metal bottom plate $b$, to which the standards are secured, end plates $b'$ and $b^2$, and side plates $b^3$ and $b^4$, which are secured to the end plates $b'$ and $b^2$, preferably by bolts $c$, passing through the side plates $b^3$ and $b^4$ and held in engagement therewith by nuts $c'$, as shown in Figs. 1 and 6. These plates $b$, $b'$, $b^2$, $b^3$, and $b^4$ form, assembled, a rectangular casing which is lined in its interior, preferably with a layer of clay $d$ and fire-brick $d'$ to form a heating-chamber $e$. The end plates $b'$ and $b^2$ of the heating-chamber $e$ are provided with substantially triangular-shaped extensions $b^5$ and $b^6$, also protected against the influence of heat by a layer of clay $d$ and fire-brick $d'$. The extensions $b^5$ and $b^6$, by means of strips or bars $f$, bolted to the same, serve to support walls $g$ and $g'$, composed of fire-brick, which, in conjunction with the extensions $b^5$ and $b^6$, form a hood $h$, held a certain distance above the fire-chamber $e$.

In order to render the fire-brick forming the walls $g$ and $g'$ removable, certain of the same, by means of bolts $f'$, are connected with their respective bars $f$, while all the brick preferably provided with grooves $g^2$ and tongues $g^3$ are interlocked with each other, as shown in Fig. 4. At its upper end the hood $h$ is partially closed by fire-brick $g^4$, leaving openings $g^5$, between which a certain amount of heat and flame rising from the fire-chamber are permitted to escape, so as to heat a pipe $i$, which, by means of brackets $b^5$, secured to the extensions $b^5$ and $b^6$, is held a certain distance above the hood $h$. The pipe $i$ is preferably U-shaped and serves to conduct air introduced therein by a blower (not shown) with the heating-chamber $e$, which air by passing through the pipe is highly heated by the portion resting above the hood $h$.

In order to heat oil and to commingle the heated oil with heated air to partially gasify the same prior to its introduction into the heating-chamber $e$, the oil-supply pipe $l$ is arranged within the branches $i'$ and $i^2$ of the pipe $i$, while a pipe $l'$, connected with the branch $i'$ and with the oil-supply pipe $l$, serves to conduct heated air from the pipe $i$ into the same. An air-valve $i^3$, connecting the pipe $i$ with an extension $i^4$, serves to control the air-supply to the heating-chamber $e$, while the oil-supply to the same is controlled by a valve $l^2$. The lower portion $g^6$ of the walls $g$ and $g'$ of the hood $h$, in conjunction with the upper portion $d^2$ of the side walls of the heating-chamber $e$, form longitudinal slots $e'$ and $e^2$, through which the greater amount of heat and flame generated in the heating-chamber $e$ and prevented from escaping upward through the hood $h$ is forced by the same through the slots $e'$ and $e^2$. Through these slots, by means of endless chains $m$ and $m'$, are conducted metal blanks $o$, to be heated, which chains are actuated by the following preferred mechanism. As shown in Figs. 1, 5, and 6, to the end plate $b^2$ of the heating-chamber $e$, by means of brackets $r'$, is secured a shaft $r$, provided with sprocket-gears $r^2$, $r^3$, and $r^4$. The outer sprocket-gears $r^2$ and $r^3$ serve to hold the endless chains $m$ and $m'$ in position on the upper surface $d^2$ of the side walls of the heating-chamber $e$ and to move the chains over this surface when the shaft $r$ is rotated by the sprocket-gear $r^4$, which is actuated by a sprocket-chain from any suitable source of power. (Not shown.) At the end of the surface $d^2$ of the heating-chamber $e$ the endless chains $m$ and $m'$ pass over guide-wheels $s$, supported, preferably, by one of the upper connecting-rods $c$, as shown in Figs. 2 and 6. In order to hold the guide-wheels $s$ in proper position with respect to the chains $m$ and $m'$, the same are arranged in chambers $d^3$, formed in the layer of clay $d$ and brick $d'$, thus protecting the same from the influence of the heat generated in the chamber $e$.

As shown in Figs. 1 and 2, the wheels $s$ do not project above the surface $d^2$ of the walls of the heating-chamber $e$ nor extend beyond the end plate $b'$ of the same, thus permitting the chains $m$ and $m'$ to pass down over the end plate $b'$ of the oil-furnace. This arrangement permits of the release of the metal blanks $o$ by the chains $m$ and $m'$ as soon as the same have left the heating-chamber $e$. This quick release of the metal blanks $o$ permits the same to be maintained in a condition in which a head can be readily formed thereon by a heading-press, (not shown,) to which the heated blanks are conducted after leaving the oil-furnace. The heating of the blanks $o$ takes place during the passing of the same through the slots $e'$ and $e^2$ of the furnace by means of the chains $m$ and $m'$, which hold the blanks securely in position during the heating operation even if the same extend with their greater portion into the heating-chamber $e$, as shown in Fig. 3.

In order to securely grip the blanks $o$ during the heating operation, each of the links $m^2$ of the chains $m$ and $m'$ is provided with an extension $m^3$, having on both sides indentations $m^4$. At their upper ends the extensions $m^3$ are preferably rounded and by being contracted below the same two contiguous extensions form jaws. In the parallel or substantially parallel position of the extensions $m^3$ the contiguous indentations $m^4$ thereof form a chamber or opening $m^5$, preferably annular in outline, so as to partially surround or embrace the metal blanks $o$. In the parallel or substantially parallel position of the extensions $m^3$ the blanks $o$ are prevented from being lifted or removed from the chains $m$ and $m'$ by the expanded portion $m^6$ of the extensions $m^3$, which project beyond the deepest portion of the indentations $m^4$, and thus form a contracted outlet for the chamber $m^5$, through which the blanks $o$ cannot pass as long as the chains are traveling over the straight surface $b^2$ of the side walls of the heating-chamber $e$. When, however, the chains $m$ and $m'$ travel in a curved path, for instance, over the periphery of the sprocket-gears $r^2$ and $r^3$ and guide-wheels $s$, the extensions $m^3$ will be brought into an oblique position with respect to each other, in which position blanks $o$ may be readily introduced between the extensions at the right-hand end of the machine, while at the left-hand end owing to the small diameter of the guide-wheels $s$, the guiding of the chains $m$ and $m'$ and the blanks $o$ will leave the chains by gravity. The blanks $o$ are conducted through the slots $e'$ and $e^2$ of the furnace with a speed which is proportional to the diameter of the blanks to be heated and to the length of the heating-chamber $e$, through which the same pass. The blanks $o$ by being securely clamped to the chains $m$ and $m'$ may extend with their greater portion into the heating-chamber $e$, to more thoroughly heat that portion of the same on which a head is to be formed. The chains $m$ and $m'$ in order to become cool are conducted through a water-tank $t$, supported by ledges $a'$ of the standard $a$ of the furnace.

Having thus described the nature and objects of my invention, what I claim as new, and desire to secure by Letters Patent, is—

1. In an oil-furnace, a heating-chamber, a hood arranged above the same and forming in conjunction with certain walls of said chamber slots, means arranged above said hood and adapted to conduct air to said heating-chamber, chains supported by certain of the walls of said chamber for carrying articles to be heated during passage through said slots and said means adapted to be heated by the heat of said chamber.

2. In an oil-furnace, an air-pipe, a heating-chamber, a hood arranged above said heating-chamber having outlets in its upper end and forming in conjunction with certain walls of the chamber slots, chains carrying articles passing through the slots, said heating-chamber and hood arranged to conduct the greater portion of heat through the slots to heat articles carried by said chains during passage therethrough and the lesser portion to said air-pipe to heat the air therein.

3. In an oil-furnace, a heating-chamber, a hood having outlets tapering toward the upper portion thereof and located above the heating-chamber and forming in conjunction with certain walls of said chamber slots, an air-pipe arranged above said hood and heated by the heat passing through the outlets thereof, chains supported by certain of the walls of the heating-chamber for conducting articles to be heated through said slots, and means for maintaining the chains in position on certain of the walls of said chamber and for actuating said chains.

4. In an oil-furnace, a heating-chamber, a hood having outlets tapering toward the upper portion thereof and located above the heating-chamber and forming in conjunction with certain walls of said chamber slots, an air-pipe arranged above said hood and heated by the heat passing through the outlets thereof, chains supported by certain of the walls of the heating-chamber for conducting articles to be heated through said slots, sprocket and guide wheels for maintaining the chains in position on certain of the walls of said chamber and for actuating said chains, said chains and wheels arranged to permit of the ready removing and replacing of said chains.

5. An oil-furnace having a heating-chamber partially open at its upper end, a hood having openings arranged above the heating-chamber to partially confine heat generated in said chamber to the same and to permit of the exit of the greater portion at the sides of said furnace and of the lesser portion at the upper end of the same, endless chains adapted to clamp and expose articles to be heated in said furnace, and means for maintaining the chains and articles carried by the same in a certain position with respect to the heating-chamber thereof.

6. An oil-furnace having a heating-chamber, a hood located above said chamber and forming in conjunction with certain walls slots, chains having links, said links having projections expanded at their free ends to form in a parallel or substantially parallel position openings with contracted outlets to securely clamp articles to be heated placed in said openings, and means for guiding and moving said chains and articles carried by the same through the slots.

7. An oil-furnace having a heating chamber, a tapering hood having side walls formed of brick only, said hood located above said chamber and forming in conjunction with certain walls slots, chains having links, said links having projections expanded at their free ends to form in a parallel or substantially parallel position openings with contracted outlets to securely clamp articles to be heated placed in said openings, and means for guiding and moving said chains and articles carried by the same through the slots.

8. An oil-furnace having a heating-chamber lined with heat-resisting material, chambers formed in said material adapted to receive guide-wheels, a hood having side walls and forming in conjunction with the side walls of said chamber oblong slots, chains having links, said links having projections arranged to clamp articles passing over the walls of said chamber and to release the same when occupying an oblique position, by passing over said guide-wheels.

In witness whereof I have hereunto set my signature in the presence of two subscribing witnesses.

MACMILLAN HOOPES.

Witnesses:
J. WALTER DOUGLASS,
THOMAS M. SMITH.